United States Patent
Shaffer et al.

(10) Patent No.: US 9,685,195 B2
(45) Date of Patent: *Jun. 20, 2017

(54) GEOGRAPHICAL LOCATION INFORMATION/SIGNAL QUALITY-CONTEXT BASED RECORDING AND PLAYBACK OF MULTIMEDIA DATA FROM A CONFERENCE SESSION

(71) Applicant: Cisco Technology, Inc., San Jose, CA (US)

(72) Inventors: Shmuel Shaffer, Palo Alto, CA (US); Mukul Jain, San Jose, CA (US); Jochen Weppner, Belmont, CA (US); Shantanu Sarkar, San Jose, CA (US); Daniel Shaffer, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 58 days.

This patent is subject to a terminal disclaimer.

(21) Appl. No.: 14/568,290

(22) Filed: Dec. 12, 2014

(65) Prior Publication Data
US 2015/0098693 A1    Apr. 9, 2015

Related U.S. Application Data

(63) Continuation of application No. 12/953,607, filed on Nov. 24, 2010, now Pat. No. 8,938,216.

(51) Int. Cl.
H04M 1/725    (2006.01)
H04N 7/14    (2006.01)
(Continued)

(52) U.S. Cl.
CPC ........ *G11B 27/11* (2013.01); *G11B 20/10527* (2013.01); *H04N 9/8205* (2013.01);
(Continued)

(58) Field of Classification Search
CPC ..................................................... H04W 40/24
(Continued)

(56) References Cited

U.S. PATENT DOCUMENTS 7,633,914 B2    12/2009    Shaffer et al.
7,706,339 B2    4/2010    Shaffer et al.
(Continued)

*Primary Examiner* — Kiet Doan
(74) *Attorney, Agent, or Firm* — Edell, Shapiro & Finnan, LLC

(57) ABSTRACT

Playback of multimedia data associated with a recorded conference session is simplified, particularly for a person who participated in the conference session from a mobile device. At a recording server that is in communication with a plurality of endpoints in a conference session, multimedia received from the plurality of endpoints participating in the conference session is recorded. The recording server obtains geographical location information for at least one mobile endpoint participating in the conference session as the at least one mobile endpoint moves. The recording server temporally correlates the geographical location information for the at least one endpoint with recorded multimedia data for the conference session. The recording server stores data tags for the geographical location information for the at least one mobile endpoint in association with the recorded multimedia data for subsequent use in indexing to map data to retrieve a portion of the recorded multimedia data for playback.

16 Claims, 10 Drawing Sheets

(51) Int. Cl.
  *G11B 27/11* (2006.01)
  *H04N 9/82* (2006.01)
  *G11B 20/10* (2006.01)
  *H04W 4/02* (2009.01)
(52) U.S. Cl.
  CPC ..... *H04W 4/028* (2013.01); *G11B 2020/1062* (2013.01); *G11B 2020/10537* (2013.01)
(58) Field of Classification Search
  USPC .... 455/407, 406, 445, 456.1, 413, 567, 573, 455/456.2, 456.3, 457; 726/1; 370/260, 370/338, 347; 701/532, 533, 487; 709/229, 217; 715/757; 342/357.13; 348/14.08; 340/10.3, 5.2
  See application file for complete search history.

(56) References Cited

U.S. PATENT DOCUMENTS

| | | | |
|---|---|---|---|
| 8,131,298 B1* | 3/2012 | Beyer, Jr. | 455/437 |
| 2003/0035406 A1 | 2/2003 | Fraser et al. | |
| 2004/0204851 A1* | 10/2004 | Fukuyasu | G01C 21/3629 701/487 |
| 2006/0023675 A1* | 2/2006 | Karaoguz et al. | 370/338 |
| 2007/0047479 A1 | 3/2007 | Shaffer et al. | |
| 2007/0168426 A1 | 7/2007 | Ludwig et al. | |
| 2009/0111437 A1* | 4/2009 | Elman | H04M 1/656 455/414.1 |
| 2009/0181699 A1* | 7/2009 | Tysowski | 455/457 |
| 2009/0220066 A1 | 9/2009 | Shaffer et al. | |
| 2009/0292782 A1* | 11/2009 | Kim | H04W 4/02 709/206 |
| 2009/0327425 A1* | 12/2009 | Gudipaty | H04N 7/147 709/205 |
| 2010/0149036 A1* | 6/2010 | Rosenberg | G06Q 30/02 342/357.31 |
| 2010/0149305 A1 | 6/2010 | Catchpole et al. | |
| 2010/0284310 A1 | 11/2010 | Shaffer et al. | |
| 2010/0306018 A1* | 12/2010 | Burtner | G06Q 10/10 705/7.19 |
| 2011/0113148 A1* | 5/2011 | Salmela | G01S 21/3438 709/229 |
| 2011/0113351 A1* | 5/2011 | Phillips | G06Q 10/10 715/757 |
| 2012/0066722 A1* | 3/2012 | Cheung et al. | 725/62 |
| 2012/0128322 A1 | 5/2012 | Shaffer et al. | |

* cited by examiner

GEOGRAPHICAL LOCATION INFORMATION/SIGNAL QUALITY-CONTEXT BASED RECORDING AND PLAYBACK OF MULTIMEDIA DATA FROM A CONFERENCE SESSION

This application is a continuation of U.S. application Ser. No. 12/953,607, filed on Nov. 24, 2010 and is currently pending, the entirety of which is incorporated herein by reference.

TECHNICAL FIELD

The present disclosure relates to recording multimedia data associated with a conference session for later playback.

BACKGROUND

With the proliferation of mobile telephony, it is common for users to participate in a conference session from their mobile devices while traveling in a car, train, bus, etc. Conference sessions are often recorded for a variety of reasons including the benefit of users who missed portions of the discussion due to poor signal reception at their mobile device. With existing recording systems, participants who missed portions of a conference due to poor wireless signal reception need to playback the entire recording of the session in order to identify the portion of interest of the recording. This can be cumbersome and time consuming.

DESCRIPTION OF EXAMPLE EMBODIMENTS

Overview

Techniques are provided to simplify the playback of multimedia data associated with a recorded conference session, particularly for a person who participated in the conference session from a mobile device. At a recording server that is in communication with a plurality of endpoints in a conference session, multimedia received from the plurality of endpoints participating in the conference session is recorded. The recording server obtains geographical location information for at least one mobile endpoint participating in the conference session as the at least one mobile endpoint moves. The recording server temporally correlates the geographical location information for the at least one endpoint with recorded multimedia data for the conference session. The recording server stores data tags for the geographical location information for the at least one mobile endpoint in association with the recorded multimedia data for subsequent use in indexing to map data in order to retrieve a portion of the recorded multimedia data of the conference session for playback.

Example Embodiments

Figure 1:
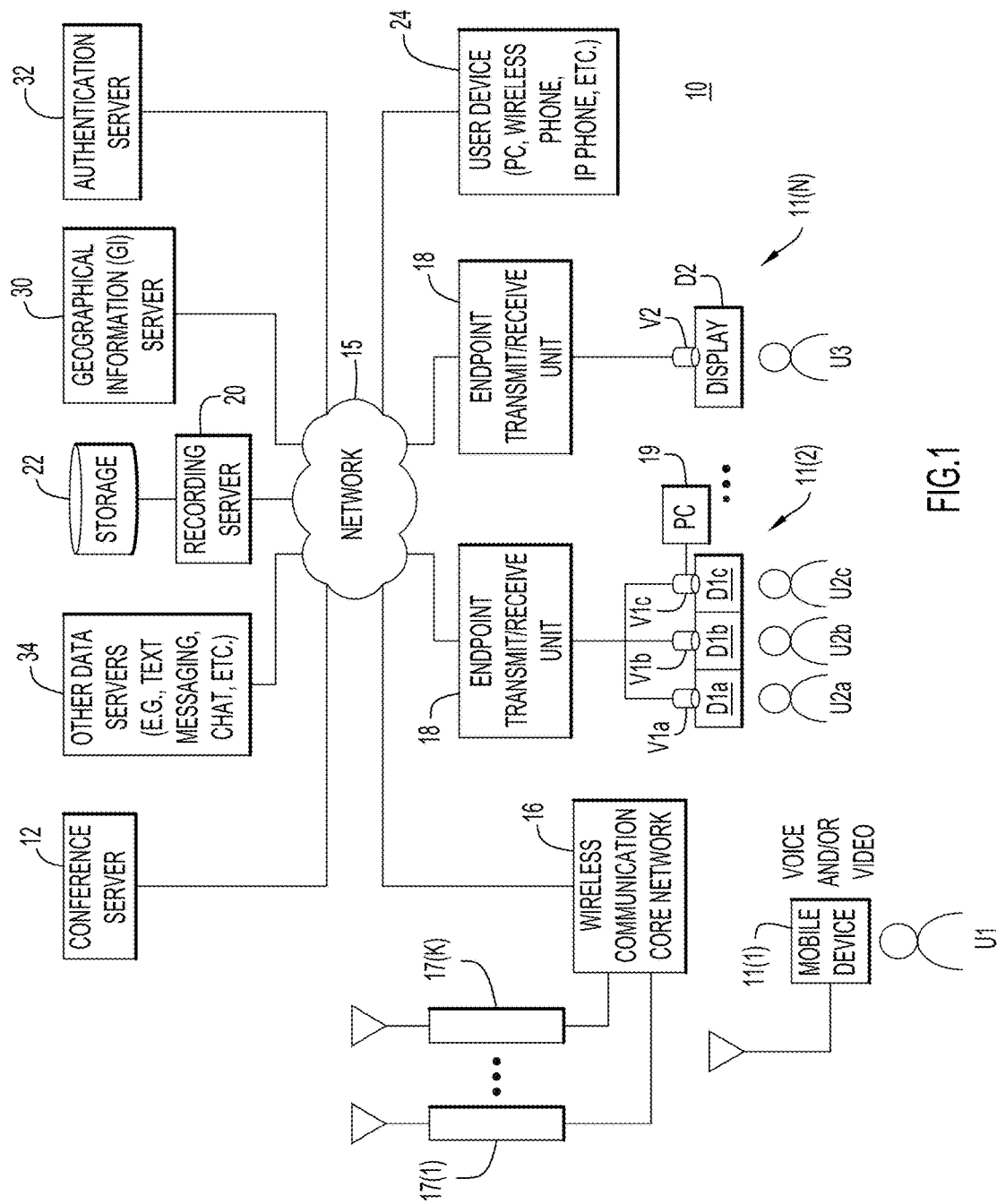
FIG. 1 is an example of a block diagram of a conference system in which a recording server is configured to perform geographical location information/signal quality-context based recording and playback of multimedia data from a conference session.

Referring first to FIG. 1, a conference system is shown at reference numeral 10. The system 10 comprises a plurality of endpoints 11(1)-11(N) capable of participating in a conference session that is supported by a conference server 12. The endpoints 11(1)-11(N) all communicate with the conference server 12 by way of a wide area network, e.g., the Internet, shown at reference numeral 15. Each endpoint 11(1)-11(N) comprises equipment to enable participation of one or more persons in a multimedia conference session.

The endpoints 11(1)-11(N) may be configured to participate in a conference session supported by any now known or hereinafter conferencing system and services, such as, for example, Cisco's Telepresence conferencing system, the WebEx® conferencing system, etc. The term "multimedia" as used herein is meant to refer to one or more of text, audio, still images, animation, video, and interactivity content forms. Thus, during a conference session, participants may speak to each other, see video of each other (contemporaneous with the voice audio), share documents or forms, share digital photograph images, animation content, etc.

Endpoint 11(1) is of the form of a mobile wireless communication device that has at least voice communication capabilities, if not also data sharing and/or real-time video communication capabilities. An example of such an endpoint device is an iPhone®, Blackberry® device or a simple wireless cellular phone device with only voice capabilities. The endpoint 11(1) wirelessly communicates with a wireless communication core network 16 by way of cell wireless base station transceivers (towers) 17(1)-17(K). A user or participant associated with mobile device 11(1) is shown at U1. In an alternative form, endpoint 11(1) may be a mobile device that is a fixture on a train, plane, car or bus that is available for anyone to use (subject to payment of a usage fee) while traveling.

Endpoint 11(2) is an example of a multi-participant endpoint that comprises an endpoint transmit/receive (Tx/Rx) unit 18 that serves as the gateway point for inbound multimedia to endpoint 11(2) and for outbound multimedia from endpoint 11(2). Connected to endpoint Tx/Rx unit 18 is a plurality of audio/data/video (ADV) capture units. For example, there are ADV capture units V1a-V1c that are connected to endpoint Tx/Rx unit 18. Each ADV capture unit V1a-V1c is, for example, a video camera with an integrated audio microphone, or the microphone for an ADV capture unit is positioned proximate a focus position for the associated video camera where a person is expected to sit. In other words, there are three positions for participants U2a-U2c at endpoint 11(2). ADV capture unit V1a is configured to capture audio and video from participant U2a, ADV capture unit V1b is configured to capture audio and video from participant U2b and ADV capture unit V1c is configured to capture audio and video from participant U2c. There is a personal computer (PC) 19 at endpoint 11(2) that is connected to the endpoint Tx/Rx unit 18, by way of ADV capture unit V1c, for example, in order to share data from the PC, such as a presentation slides, photos, videos, audio, etc. There may be a PC for each participant at endpoint 11(2) but for simplicity one PC 19 is shown. The endpoint Tx/Rx unit 18 is configured to encode and transmit the captured multimedia from each participant over the network 15. Although the example described in connection with FIG. 1 shows a 1:1 association between specific video cameras and specific users this was is only by way of an example and it should be understood that other associations are possible.

In addition, endpoint 11(2) comprises video display screens or panels D1a, D1b and D1c connected to the endpoint Tx/Rx unit 18. These display panels are configured to display multimedia received and decoded by the endpoint Tx/Rx unit 18. Audio speakers are integrated into the display panels D1a, D1b and D1c to provide audio output for any audio in received multimedia at the endpoint 11(2). Separate non-integrated audio speakers may be provided at the endpoint and coupled to the endpoint Tx/Rx unit 18.

Endpoint 11(N) is a single participant version of endpoint 11(2). Endpoint 11(N) comprises an endpoint Tx/Rx unit 18, a single ADV capture unit V2 and a single display panel D2 associated with participant U3. Endpoints 11(2) and 11(N) are generally fixed at a particular location and in one example are Telepresence conference rooms in a building.

Another example of an endpoint is a desktop or laptop computer or Internet Protocol (IP) phone that is connected to the network 15 by a wired or wireless connection, and has IP telephony (voice or voice/video) capability.

There may be multiple endpoints of any of the types of endpoints 11(1)-11(N) involved in a conference session. Moreover, the endpoint configurations shown in FIG. 1 are only by way of example and not intended to be limiting.

A conference session involving any two or more of the endpoints 11(1)-11(N) is maintained by a conference server 12. During the conference session, each endpoint sends multimedia sourced from that site to the conference server 12. The conference server 12 processes the multimedia received from each of the endpoints, and generates and transmits separate streams to the other endpoints so that each endpoint receives the multimedia captured from the other endpoints.

When a conference session is to be recorded, the conference server 12 communicates with the recording server 20 to engage the recording resources of the recording server 20. When this occurs, the recorder server 20 will receive the multimedia from the endpoints participating in a conference session. The recording server 20 stores the recorded multimedia for a conference session at a local or remotely located storage unit 22. A user may access recorded multimedia for a conference session from any suitable user device, an example of which is shown at reference numeral 24, and includes a personal computer (PC), laptop computer, Internet Protocol (IP) phone, wireless phone, etc. The user device 24 connects to the recording server 20 by way of the network 15. A user, whether a conference participant or other individual, may seek access to recorded content for a conference session from a user device or from a Telepresence room, etc.

FIG. 1 also shows a geographical information server 30, an authentication server 32 and other data servers 34. The geographical information server 30 maintains a database of geographical information (e.g., maps) against which a location of a participant can be tracked during a conference session according to the techniques described herein. For example, the geographical information server 30 is implemented by way of the Google® maps server functionality or some other similar third party geographical information system (GIS) server or a proprietary and internally maintained GIS server.

The location of a mobile endpoint, such as endpoint 11(1), is tracked through the location tracking capabilities of a wireless communication server provider that operates the network 16. One type of location tracking is to use global positioning system (GPS) satellites in the case where the mobile endpoint has a GPS receiver and can relay its location to the network 16 which in turn sends it to the conference server 12 and recording server 20 during a conference session. Another type of location tracking is radio frequency (RF) based according to signal strength with respect to signals sent and received between the endpoint 11(1) and the wireless base station transceivers 17(1)-17(K).

The authentication server 32 is a computing apparatus that is configured to verify that a person is truly the person he/she represents himself/herself to be when seeking access to recorded content for a conference session.

The functions of the conference server 12, authentication server 32 may be incorporated or integrated with the functions of the recording server 20.

Figure 2:
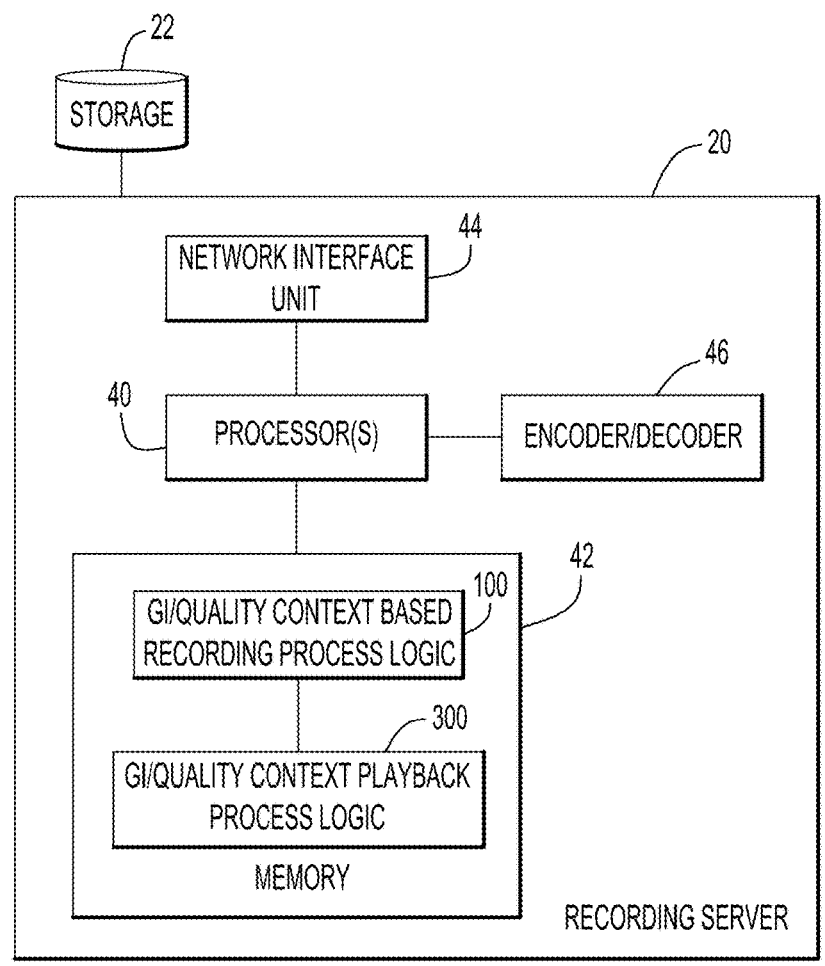
FIG. 2 is an example of a block diagram of a recording server configured to perform geographical location information/signal quality-context based recording and playback of multimedia data from a conference session.

Turning to FIG. 2, an example of a block diagram of the recording server 20 is now described. The recording server 20 comprises a processor 40, memory 42, a network interface unit 44 and an encoder/decoder 46. The processor 40 is a microprocessor, microcontroller or other data processing unit (or multiple instances of the same) that is configured to execute instructions stored in memory 42 to carryout the operations described herein.

The memory 42 comprises, for example, read only memory (ROM), random access memory (RAM), magnetic disk storage media devices, optical storage media devices, flash memory devices, electrical, optical, acoustical or other physical/tangible memory storage devices. In general, memory 42 comprises one or more tangible computer readable media in which computer software may be stored or encoded for execution by the processor 40.

The network interface unit 44 is an Ethernet card, for example, that transmits and receives data via network 15, and particular receiving the multimedia from the plurality of endpoints (or from the conference server) via the network 15, accessing the GI server 30 for map information, and for receiving location information for a mobile endpoint, e.g., endpoint 11(1), during a conference session.

The encoder/decoder 46 is configured to encode any multimedia data for storage or decode any encoded multimedia data for storage, depending on whether the recorded multimedia data is to be stored in an encoded state or decoded state.

The processor 40 is configured to execute instructions stored in the memory 42 for carrying out the operations described herein. In particular, the processor 40 is configured to execute program logic instructions (i.e., software) stored in memory 42 for GI/quality context based recording process logic 100 and for GI/quality context playback process logic 300. Generally, the GI/quality context based recording process logic 100 is configured to cause the processor 40 to store data tags in association with recorded multimedia data for a conference session, where the data tags are for a variety of purposes described herein. The GI/quality context playback process logic 300 is configured to cause the processor 40 to playback recorded content for a conference session by directing a play-out pointer for playback of the recorded multimedia content to a portion related to one or more of the data tags as described herein.

In general, the operations of processor 40 may be implemented by logic encoded in one or more tangible media (e.g., embedded logic such as an application specific integrated circuit, digital signal processor instructions, software that is executed by a processor, etc), wherein memory 42 stores data used for the operations described herein and stores software or processor executable instructions that are executed to carry out the operations described herein. The process logic 100 and 300 may take any of a variety of forms, so as to be encoded in one or more tangible media for execution, such as fixed logic or programmable logic (e.g. software/computer instructions executed by a processor) and the processor 40 may be an application specific integrated circuit (ASIC) that comprises fixed digital logic, or a combination thereof. For example, the processor 40 may be embodied by digital logic gates in a fixed or programmable digital logic integrated circuit, which digital logic gates are configured to perform the operations of the process logic 100 and process logic 300. In one form, the muted content recording process logic 100 and muted content recording process logic 300 are embodied in a processor or computer-readable memory medium (memory 42) that is encoded with instructions for execution by a processor (e.g. a processor 40) that, when executed by the processor, are operable to cause the processor to perform the operations described herein in connection with process logic 100 and process logic 300. Memory 42 may also buffer multimedia (voice, video, data, texting) streams arriving from the various endpoints as they are being transitioned into the storage 22.

Figure 3:
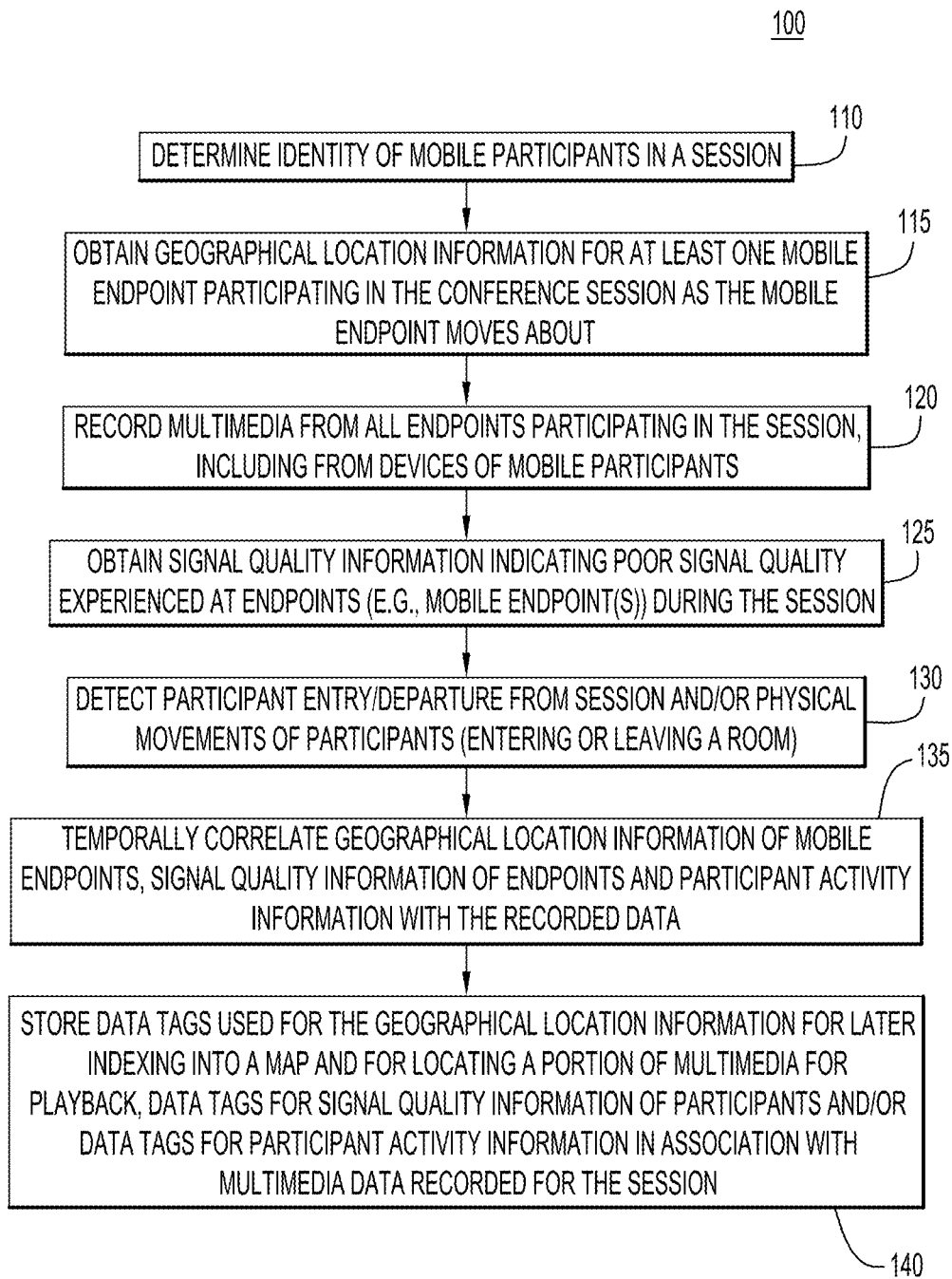
FIG. 3 is an example of a flow chart for a process performed at a recording server for geographical location information/signal quality-context based recording of multimedia data from a conference session.

Turning now to FIG. 3, the GI/quality context based recording process logic 100 is described. When a conference session begins and is to be recorded, the processor 40 of the recording server 20 receives a notification from the conference server 12 that a conference session has been initiated. At 110, the recording server receives information about the conference session, including the location of the endpoints and any identifiers of the participants and invitees to the conference session. The identifiers may include identifiers, such as email addresses, corporate names or identifiers, GPS location, IP addresses of the participating endpoints, specific switch port number to which an endpoint is connected, etc., for each of a plurality of participants at each of the endpoints participating in the conference session, and the identifiers for the participants in the conference session are stored. Also at 110, and important to the operations described herein, the recording server obtains information identifying any participants in the conference session that are participating from a mobile endpoint, examples of which are described above in connection with FIG. 1.

At 115, the recording server 20 obtains or receives geographical location information for at least one mobile endpoint participating in the conference session as the at least one mobile endpoint moves about a geographical region. The geographical location information may be in the form of GPS location information that is reported from the mobile endpoint device (via the mobile network 16) to the recording server 20, as described herein. In one form, the GPS information is automatically converted by the recording server 20 into location names (e.g., names of streets, highways, landmarks, etc.). For example, a GPS location "37.418636, -121.919285" is translated to the street address 560 McCarthy Boulevard. As explained hereinafter, from the geographical location information, tags are generated that are indexed to geographic information at the GI server 30 for later retrieval of the geographic information of a mobile participant temporally correlated to the recorded multimedia for the conference session.

At 120, the recording server 20 records all multimedia from all endpoints participating in the conference session, including from devices associated with the mobile participants. At 125, when signal quality information is to be used as a context for later retrieval of recorded multimedia data for a conference session, then the recording server obtains signal quality information indicating poor audio and/or video signal quality experienced at a particular endpoint (e.g., at least one mobile endpoint) during the conference session. The recording server 20 may obtain the signal quality information from the wireless communication core network 16 insofar as each mobile device in the network periodically sends reports about its signal reception quality. In another form, mobile phone devices (e.g., device 11(1) shown in FIG. 1) can support applications on their operating systems, such as an application that monitors voice (and video) signal quality received by the device. The application on the mobile device sends to the conference server 12 (and/or recording server 20) a notification of poor signal reception quality. This functionality is described further hereinafter in connection with FIGS. 4 and 5.

At 130, the recording server analyzes the multimedia (e.g., audio or video) for the conference session (in real-time or after the conference session is complete) to detect when a participant may have entered or departed from the conference session or to detect movements of participants indicating that a participant may have entered or departed from a room where an endpoint is located, e.g., a Telepresence room. The recording server 20 may detect that a participant enters or leaves the conference session by receiving a notification from the conference server 12 that maintains the conference session since the conference server 12 is in communication with each endpoint and can determine when an endpoint has joined the conference and when it has disconnected from the conference. Thus, the recording server 12 detects when a participant joined or left the conference session.

Moreover, at 130, the recording server 20 may perform video image analysis of video data received from one or more endpoints to detect a predetermined physical movement of a participant that is indicative of that person entering a room or leaving a room (or of a person stationary), and the recording server may use video image recognition to identify the person who enters or leaves a room (or is stationary) during the conference session.

The term "participant activity information" is used herein to refer to the detection of entry/departure of a participant in a conference session and of the physical movement (into and out of a room, or stationary status) of a participant during the conference session.

At 135, the recording server 20 temporally correlates the geographical location information of mobile endpoints, signal quality information associated with endpoints and participant activity information with the recorded multimedia data. Thus, by virtue of operation 135, the recording server 20 captures the GPS location information of various conference participants for recording along with the recorded multimedia data for the conference session.

At 140, the recording server stores data tags for the geographical location information in association with the recorded multimedia data for later/subsequent use in indexing to map data (at the GI server 30) in order to locate or retrieve a portion of the recorded multimedia data of the conference session for playback. The data tag created for the geographical location of a participant is associated with the identifier of the participant and is associated at the proper time in the recorded multimedia. This tag is added to the indexing table of the multimedia recording.

In addition, at 140, when signal quality information is to be used as a context for later playback of multimedia data, then the recording server stores data tags for signal quality information (for at least a particular endpoint) in association with the multimedia data recorded for the session. Similarly, when participant activity information is to be used as a context for later playback of multimedia, then the recording server stores data tags for participant activity information (e.g., when a particular participant at endpoint joined or left the conference session or when a predetermined physical movement of a particular participant has occurred) in association with the recorded multimedia data for the conference session.

Figure 4:
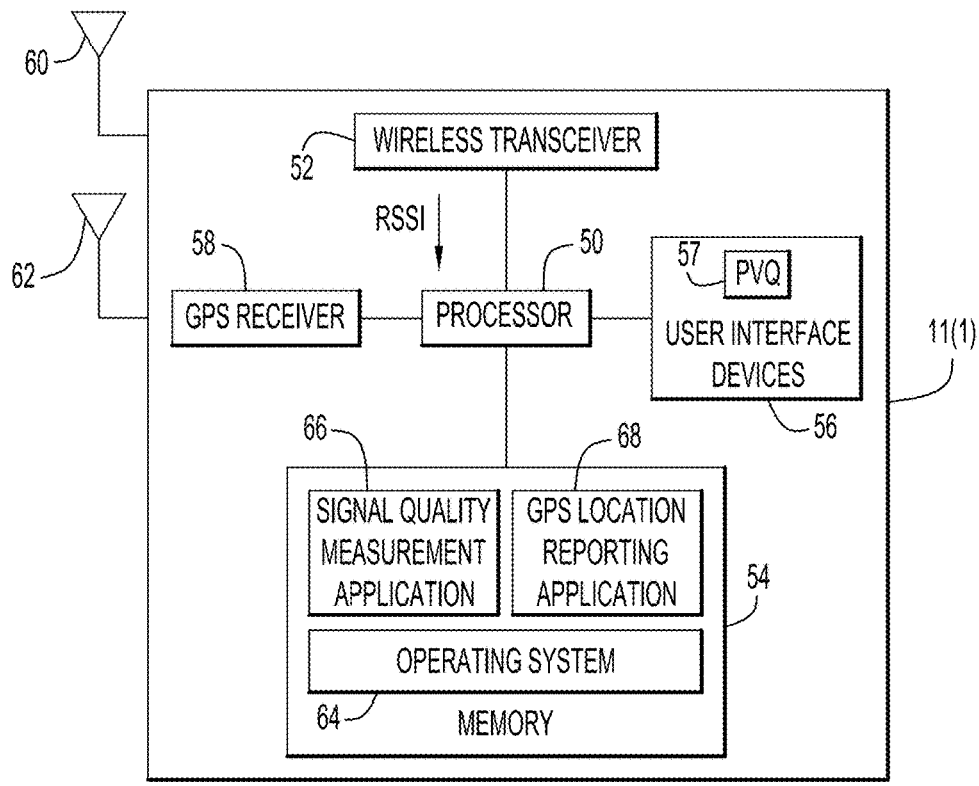
FIG. 4 is an example of a block diagram of a wireless mobile endpoint device configured to generate geographical location information and signal quality information.

Reference is now made to FIG. 4 for an example of a block diagram of mobile endpoint device 11(1). In this example, the endpoint device 11(1) has wireless wide area network communication capability. To this end, the endpoint device 11(1) comprises a processor (e.g., microprocessor) 50, a wireless transceiver 52, memory 54, user interface devices 56, a GPS receiver 58, an antenna 60 used for transmitting and receiving signals via the wireless network and an antenna 62 for receiving GPS signals. The user interface devices 56 include a touch screen display (with a virtual keyboard), microphone, speaker, physical keypad (with physical keyboard), etc. In addition, the user interface devices 56 include a physical or virtual (touch-screen displayed) button 57 that is dedicated to poor voice quality (PVC). The device user may press the PVC button 57 to send a message to the conference server 12 and/or the recording server 20 indicating that he/she is experiencing poor signal reception quality (for received audio or video). The GPS receiver 58 allows the device 11(1) to determine its GPS location based on received GPS signals.

Stored in memory 54 are software instructions for an operating system 64 and for applications that run on the operating systems 64. For example, there is a signal quality measurement application 66 and a GPS location reporting application 68. The signal quality measurement application 66 monitors signal quality (received audio or video quality) at the endpoint device 11(1) and sends information to the conference server 12 and/or recording server 20 for recording along with the recorded multimedia for the conference session.

When the signal quality measurement application 66 detects a sub-par (e.g., below a threshold) received audio (voice) or video quality, it causes the processor 50 to generate and send a message to the conference server 12 and/or recording server 20 indicating that the endpoint device 11(1) is experiencing poor signal reception quality and thus the participant at the endpoint 11(1) may be having difficulties hearing or seeing the conference session. As explained herein, the conference server 12 or recording server 20 uses these messages to generate data tags to be stored along with the recorded multimedia data and/or to create entries in an index table into the recorded multimedia data.

In another form, the wireless transceiver 52 generates receive signal strength information (RSSI) for received wireless signals as part of its normal operations. The processor 50 receives the RSSI from the wireless transceiver 52. The signal quality measurement application 66 may use the RSSI as an indicator/measure of received audio or video quality. Thus, the signal quality measurement application 66 is configured to detect when the RSSI falls below a predetermined level (indicative of the audio or video quality being below a threshold) and sends a message to the conference server 12 and/or recording server 20.

In yet another form, the user may select the PVC button 57 whenever he/she is experiencing poor received audio or video quality. In response, the signal quality measurement application 66 sends a message to the conference server 12 or recording server 20 that is used to mark a segment of the recorded multimedia data for the conference session as difficult to comprehend.

In all of these signal quality examples, the ultimately purpose is to send a message to the recording server 20 in order for it to create and store a tag (associated with a specific participant) for storage with the recorded multimedia data and for later use as a pointer to a particular segment of the recorded multimedia data which the participant may have had difficulty comprehending due to the poor signal reception quality.

The GPS location reporting application 68 is used to send messages to the conference server and/or recording server 20 as to the geographical location of the device 11(1) during a conference session. This recording server 20 generates data tags for the geographical location of the endpoint device to be stored in association with the recorded multimedia data for the conference session for subsequent use in indexing to map data in order to locate or retrieve a portion of the recorded multimedia data for playback.

Figure 5:
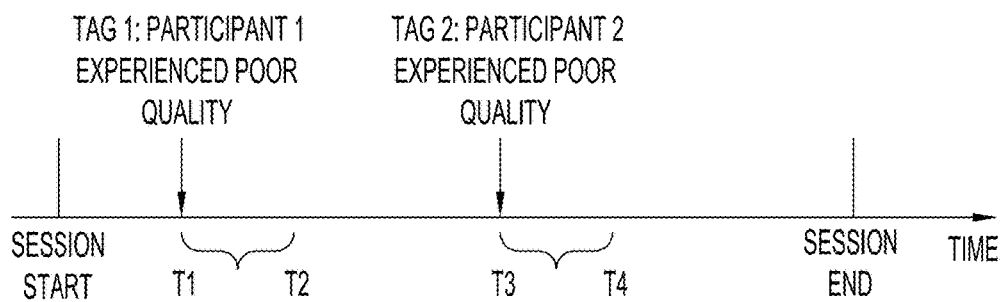
FIG. 5 is an example of a timeline associated with a conference session and illustrating the storage of data tags associated with poor signal reception quality experienced at one more endpoints during the conference session.

Referring now to FIG. 5, a diagram is now described that depicts as to how the recording server 20 stores the tags pertaining to poor signal reception quality, generated in response to any of the techniques described herein. FIG. 5 shows that based on messages received from a mobile endpoint device (or from the wireless communication core network 16 for a mobile endpoint device), the recording server 20 stores a tag that indicates when in time a specific participant was experiencing poor signal reception quality. For example, a first data tag, T1, is stored indicating that at time T1 and until time T2, participant 1 was experiencing poor signal reception quality. Similarly, a second data tag, T2, is stored indicating that at time T3 and until time T4, participant 2 was experiencing poor signal reception quality. The data tags may be created and stored by the recording server 20 in response to poor signal reception quality messages sent for an endpoint device according to any of the techniques described herein.

Figure 6:
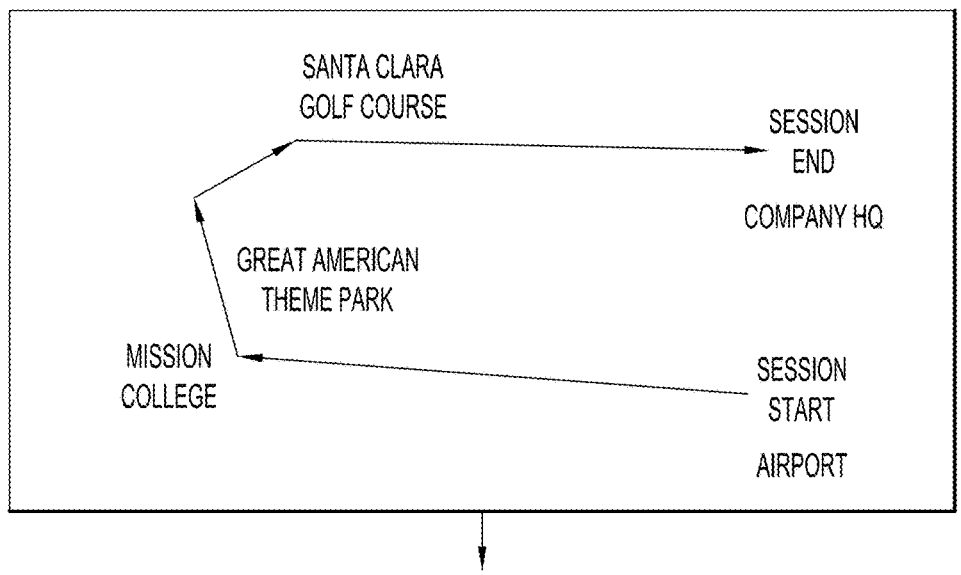
FIG. 6 is an example of a diagram depicting the storage of data tags associated with the geographical location information tracking movement of a mobile endpoint during a conference session.

FIG. 6 is a diagram that depicts how location information of a mobile participant is tracked and GI related tags are stored with the recorded multimedia data for the conference session. In FIG. 6, a map is shown to depict the movement of a mobile endpoint during a conference session, in which the mobile endpoint was located at the airport when the conference session began, and the mobile endpoint traveled passed several landmarks (Mission College, Great American Theme Park, and Santa Clara Golf Course) before reaching Company Headquarters (HQ) when the session ended. Using real-time location information of the endpoint device obtained using GPS techniques and from messages sent to the conference server 12 and/or recorder server 30, the recording server 20 generates and stores data tags for the geographical information of the mobile endpoint device in association with the recorded multimedia data for subsequent use in indexing to map data in order to locate or retrieve a portion of the recorded multimedia data of the conference session for playback. The data tags are generated on a periodic basis (for example, every 10 seconds) to track the movement of the mobile endpoint during the conference session.

Figure 7:
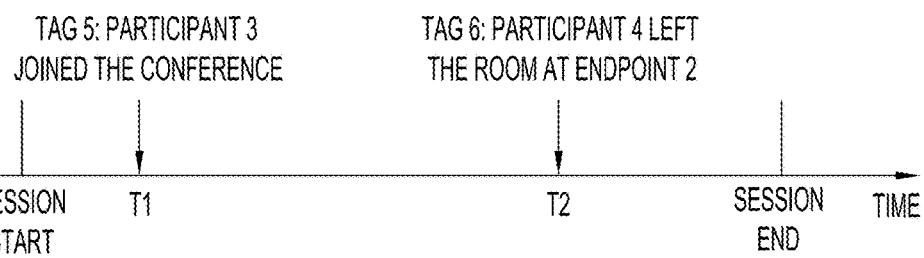
FIG. 7 is an example of a timeline associated with a conference session and illustrating the storage of data tags associated with a participant joining or leaving the conference session or the detection of a predetermined physical movement of a participant during the conference session.

Referring now to FIG. 7, a timeline is shown that illustrates data tags stored based on participant activity information. Participant activity information, as described herein, includes information indicating when a participant joins or leaves the conference or when a participant enters or leaves a room during a conference. The conference server 12 knows in real-time when an endpoint device connects and disconnects from a conference session. Thus, the conference server 12 can send a message to the recording server when an endpoint connects to and disconnects from the conference session. The recording 30 can generate a data tag based on such a message, and store the data tag temporally correlated with the timeline of the recorded multimedia data. Thus, FIG. 7 shows that at time T1, the recording server 20 generates a data tag, Tag 5, indicating (based on a message received from the conference server) that participant 3 (at a particular endpoint) joined the conference. Similarly, at time T2, the recording server 20 generates a data tag, Tag 6, indicating (based on a message received from the conference server) that participant 4 left the room (e.g., a Telepresence room) at endpoint 11(2). It is to be understood that the operation of generating a data tag (for geographical location information, signal quality information or participant activity information) may occur at the recording server 20, the conference server 12 or some intermediary computing resource connected to the network 15.

Figure 8:
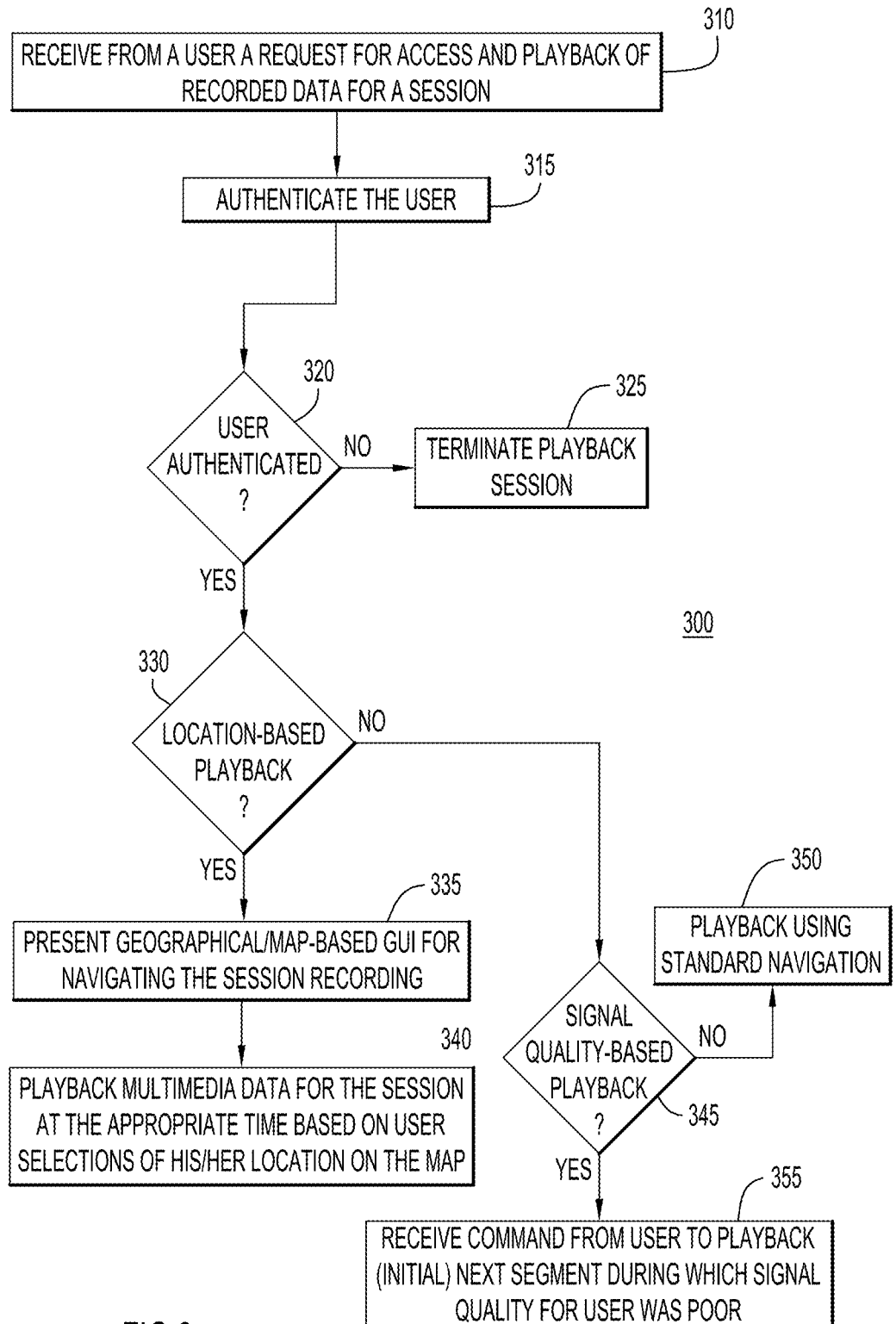
FIG. 8 is an example of a flow chart depicting a process for geographical location information/signal quality-context based playback of multimedia data from a conference session.
Figure 9:
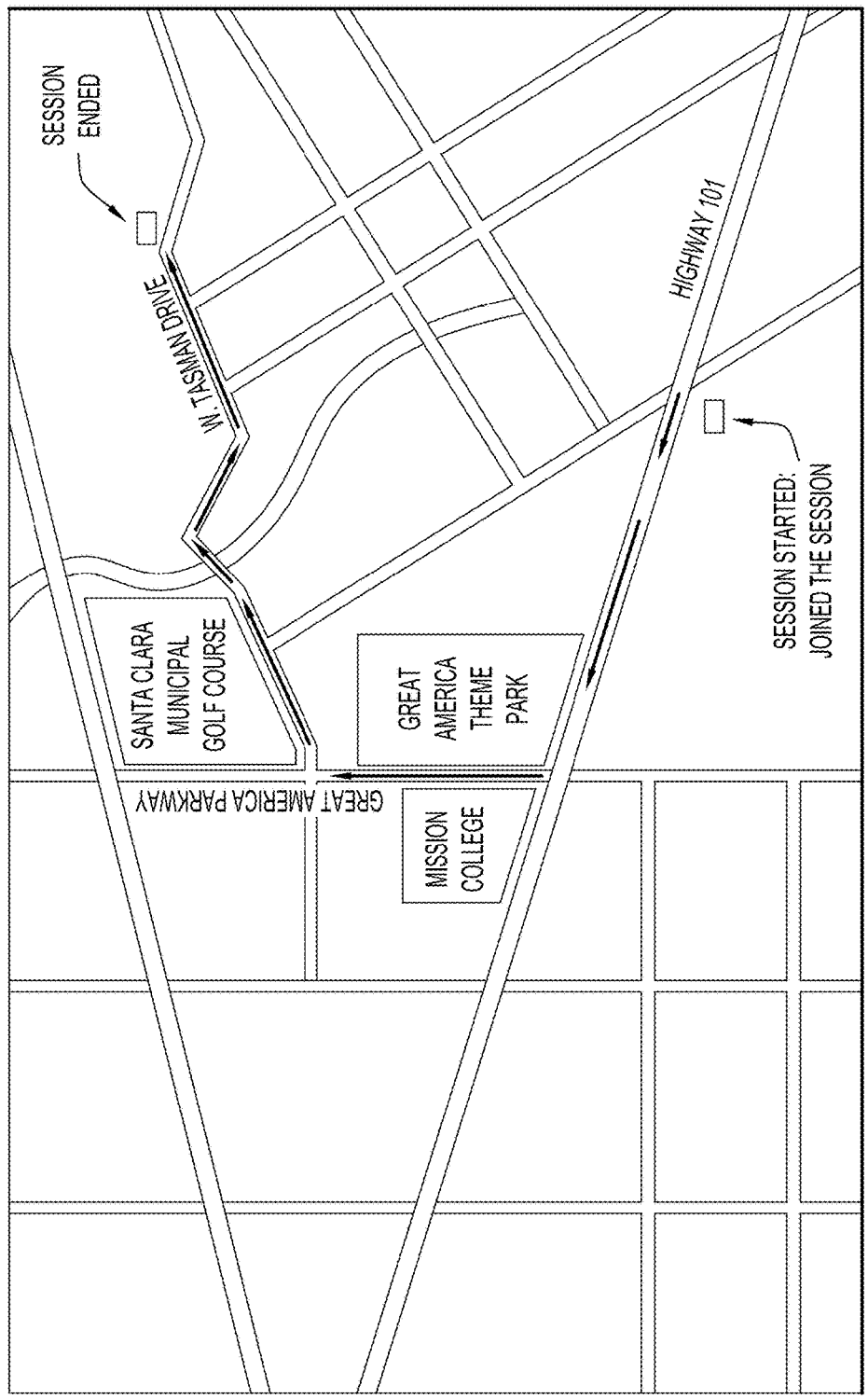
FIGS. 9 and 10 are examples of maps that are displayed to track movement of a mobile endpoint during a conference session for purposes of retrieving a particular segment of recorded multimedia content for the conference session.
Figure 10:
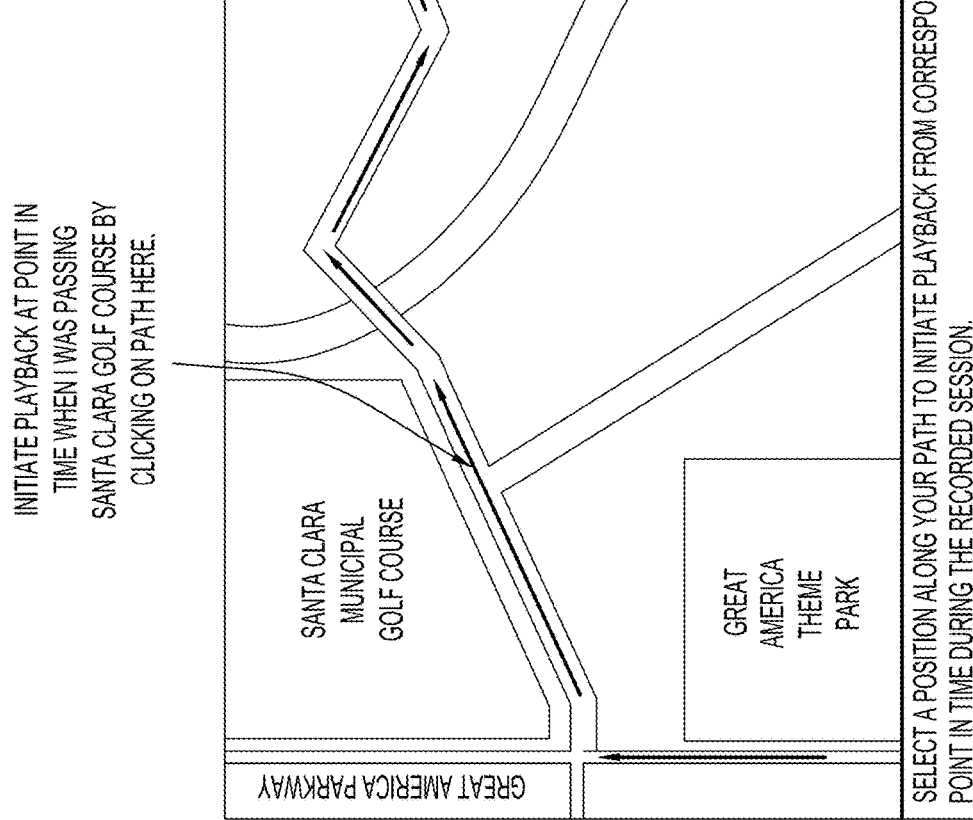

Reference is now made to FIG. 8, together with FIGS. 9 and 10, for a description of the GI/quality context playback process logic 300. At 310, the recording server 20 receives from a user, e.g., at a user device 24 (FIG. 1), a request for access and playback of recorded data for a conference session. At 315, the user is authenticated (by way of the authentication server 32. If the authentication server 32 successfully authenticates the user at 320, the process continues to 330, otherwise playback access to the user is denied and terminated as indicated at 325.

At 330, the user is prompted or otherwise given the option to select location-based playback. Location-based playback is a playback mode in which the user is displayed a map of the location of a participant (perhaps the user himself) during the conference session and uses that map to determine when to start playback of the recorded multimedia data for the conference session.

The location-playback mode is useful for the following scenario. A user participates in a conference session using his/her mobile phone. While the user was driving during the conference session, he/she experienced poor signal reception and found it difficult to follow the discussions during the conference session. The next day the user returns to the office and decides that he/she would like to replay the portion of the conference session when he/she was experiencing poor signal quality. Using an existing system, the user would have to manually navigate through the entire recording until he/she finds the segment or portion of interest.

By contrast, according to the techniques described herein, when the user selects the location-playback mode, then at 335, the recording server presents the user with a display comprising a map-based graphical user interface (GUI) for navigating the multimedia data for the session recording. An example of a map is shown in FIG. 9. The user can see a map showing his location while he was driving and participating in the conference session. The arrows in FIG. 9 illustrate the user's location and movement during the conference session from the beginning to the end of the conference session.

Using the displayed map, the user can specify that he/she would like to hear the recording of the conference starting at the point in time when the user was at or near a landmark or other location. For example, as shown in FIG. 10 (a zoomed-in portion of FIG. 9), the user can select or click with a mouse/cursor along the displayed path, in order to directly navigate to that portion of the conference session when he/she was at that location. There is a textual message at the bottom of FIG. 10 to instruct the user as to how to retrieve multimedia data for the conference session ("Select a position along your path to initiate playback from the corresponding point in time during the recorded session.") In the example of FIG. 10, the user selects a point on his/her path when he/she was located near the Santa Clara Golf Course. In response to this selection, at 340 (in FIG. 8), the recording server 20 will playback multimedia data for the session at the appropriate time based user selections of his/her location on the map. In other words, the recording server 20 automatically jumps the play-out pointer to the point in time in the recorded multimedia data when the user was at that selected location, using the stored data GI tags indicating the geographical location of the user.

Thus, as depicted in FIG. 9 and by operations 335 and 340 in FIG. 8, the recording server 20 is configured to display a map to a user that participated in the conference session at a mobile endpoint for which geographical location information was obtained. The recording server 20 receives a selection from the user of a location in the displayed map and retrieves multimedia data for the conference session to playback to the user beginning at a period of time during the conference session when the user was at the location of the selection in the displayed map.

As an alternative to the map GUI shown in FIG. 10, the user may specify a particular landmark or location (by textual or voice input) and the recording server will search the tags stored for that user (participant in the conference session) and jump the play-out pointer to the corresponding point in time in the recorded multimedia data when the user was at that specified location.

In accordance with still a further feature, the user may know from experience that wireless mobile communication service near a particular landmark or on a particular road is weak or inadequate. The user may request that the recording server 20 (or conference server 12) store data noting when he/she drives along or past that location so that it automatically replays that portion of the conference session to the user at a later time. In other words, the recording server 20 stores policy data indicating that a particular user is to be played back multimedia content for a conference session that the particular user participates in, at a point in time when the user is at a specific geographical location. This allows the user to initiate playback of the desired portion of the conference session at a later time via a user-friendly interface that is adapted for a mobile device. The recording server 20 may automatically present the particular user with this playback selection option when he/she logs onto the recording server 20 for playback of a conference session that he/she participated in while he/she was traveling through the specific geographical location.

Referring back to FIG. 9, when the user elects not to use the location-based playback mode, then operation 345 is invoked. At 345, the user is given the option of a signal quality context-based playback mode or a standard navigation playback mode as indicated at 350. When the user selects the signal quality context-based playback mode, he/she issues a command through a suitable graphical or voice-based user interface to go to the (initial) or next portion of a recording for which the user's voice (or video) reception quality was tagged as being poor. At 355, the recording server 20 receives this command and retrieves the initial or next segment during which signal quality for user was poor, and begins playback to the user at (or shortly before) the point in time when the poor signal quality tag was stored for the recorded multimedia. As shown in FIG. 5, a segment lasting a given period of time may be played back because the poor signal quality tag was associated with the duration of that segment of the recorded multimedia data for the conference session. Thus, the recording server 20 uses the poor signal quality tags to index into the recorded multimedia data and position the play-out pointer to the corresponding point in time during the session when the poor signal quality tags were stored for that user. The recording server 20 plays back the recorded segments during which the user had been experiencing poor signal quality and therefore likely was not able to hear or see the conference session. Again, the operation at 355 involves the recording server receiving a command from a user to playback the recorded multimedia data from a point in time when the particular endpoint experienced poor audio and/or video signal quality, and in response to the command, retrieving for playback to the user a portion of the recorded multimedia data during which the particular endpoint experienced poor audio and/or video signal quality.

Figure 11:
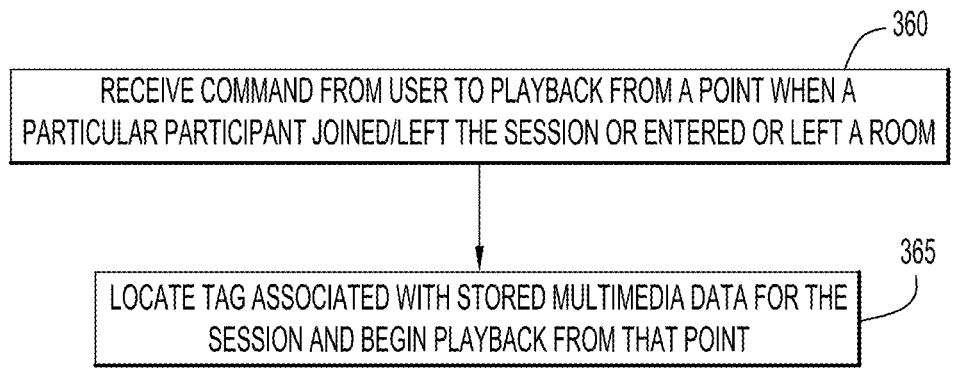
FIG. 11 is an example of a flow chart depicting a process to playback the recorded multimedia content for a conference session at a time when a participant has joined or left the conference is when a predetermined movement of the participant occurred.

Reference is now made to FIG. 11. FIG. 11 illustrates additional operations performed at the recording server 20 based on participant activity information generated during a conference session. As explained above, participant activity information relates to the joining and leaving of a participant to/from a conference session, as well as movement of a participant in and out of conference room during a conference session. At 360, the recording server receives a command from a user to playback the recorded multimedia data for a conference session from a point when a particular participant joined/left the session or entered or left a room. The user may enter the name or other identifier of the participant whose activity is to be used as a pointer to navigate to a particular segment of the recorded multimedia data. At 365, the recording server searches stored data tags for one that contains the name or identifier supplied by the user at 360, and when it locates such a data tag, directs the play-out pointer to the position in time of the recorded multimedia data when the tag was stored or associated, and in so doing retrieves a portion of the recorded multimedia data at a point in time relative to when a particular participant (associated with the name or identifier supplied by the user) joined or left the conference session or when the predetermined physical movement of the particular participant occurred. The techniques of FIG. 11 may also be applied to tags stored for instances when a participant is stationary during a conference session, as opposed to moving in or out of a room during the conference session.

Figure 12:
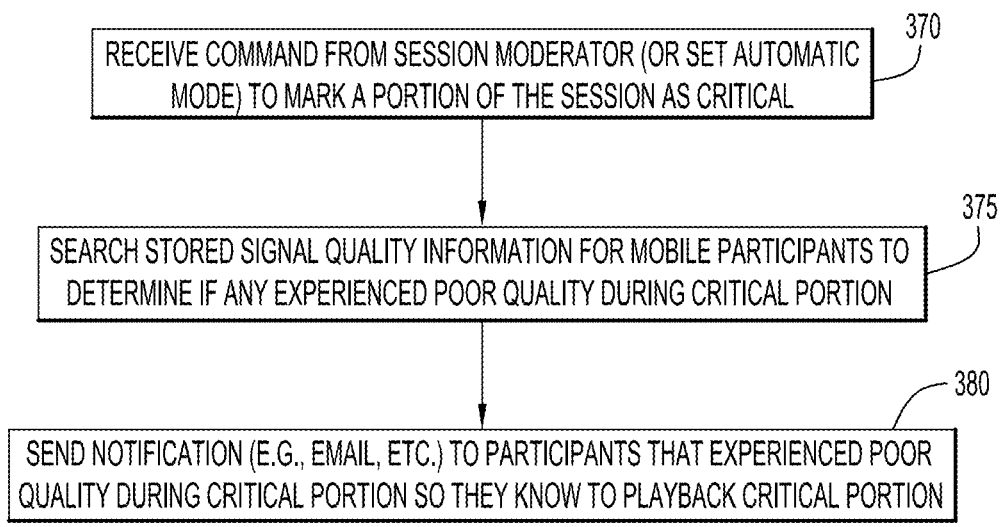
FIG. 12 is an example of a flow chart depicting a process to notify participants of a conference session that about their poor signal quality experience during a critical segment of the conference session.
Figure 13:
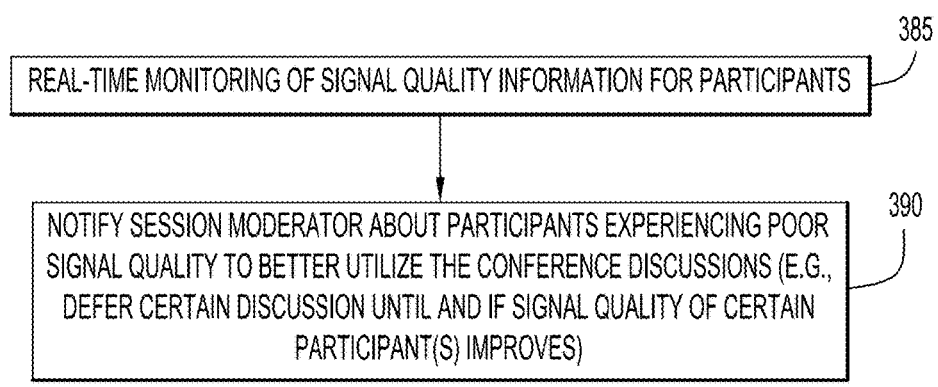
FIG. 13 is an example of a flow chart depicting a process to notify a conference moderator or host that one or more participants to a conference session are experiencing poor signal quality.

FIGS. 12 and 13 illustrate flow charts for still further operations of the recording server 20 or conference server 12 in connection with a conference session. First, in FIG. 12, operations are shown that allow a conference moderator to control the marking or tagging of portions of a conference session. For example, a conference moderator may want to ensure that all conference participants (including those that dialed in from mobile endpoint devices) are aware of a critical portion of a conference session. At 370, the recording server 20 (or conference server 12) receives a command from a conference moderator (host) to mark a certain section of a conference session as critical. The moderator may generate this command by selecting a designated key, for example, on a IP telephone, PC, etc., at a conference endpoint, sending a particular key sequence, selecting from a drop-down on-screen menu, etc., at the time during the conference session of the critical segment. In another form, the moderator may mark a particular segment as critical after the actual conference session has ended and while playing back the recorded multimedia data for the conference session. In response to the command, at 375, the conference server 12 or recording server 30 searches the signal quality tags stored for the participants (if any) in order to determine whether there are any endpoints that had experienced poor signal quality during the critical segment marked by the moderator. At 380, the recording server returns a list of participants (their identifiers) that are determined to have experienced poor signal quality during the critical segment. This list may be sent to the moderator, or the recording server 20 or conference server 12 may automatically send a notification (email message) to the participants identified at 375 who have experienced poor signal quality during the critical segment. This notification will alert these users to log onto the recording server and initiate playback of the conference session, and in particular playback of the critical portion of the conference session. Thus, in one form, the recording server sends an email notification to each of the participants who experienced poor signal quality during the critical segment, where the email may comprise a link (universal resource locator) to the recording server 20, such that once the user logs on and is authenticated, the recording server automatically navigates the play-out pointer to the critical segment of the conference session for playback to the user. The user need not supply any further input (other than authentication input) in order to initiate playback of the critical segment. In sum, the operations 370-380 involve the recording server storing data indicating whether and when one or more endpoints are experiencing poor signal quality during the conference session, storing data marking a segment of the recorded multimedia data for the conference session as being of particular interest, and searching the stored data to determine whether any one or more or the endpoints experience poor signal quality during the segment of the recorded multimedia data.

Reference is now made to FIG. 13. In FIG. 13, a flow chart is provided for operations that use real-time monitoring of (audio and/or video) signal quality experienced at endpoints in a conference session. For example, the moderator or host of a conference session receives real-time indications about the signal quality experienced by the conference participants. Recall from FIG. 3, operation 125, that the recording server 20 (or conference server 12) receives reports related to signal quality information from the endpoints during a conference session (as explained above). At 385, the recording server monitors these signal quality reports/messages. At 390, the recording server 20 (or conference server 12) generates and sends a notification to an endpoint unit where the conference moderator is located to indicate that there are one or more participants experiencing poor signal quality. The moderator can then use this notification to make changes to better utilize or optimize the conference session discussions. The moderator may defer discussions on a particular critical topic until the signal quality improves at one or more endpoints, or at a certain endpoint. For example, the moderator may notice that a particular participant, e.g., a Chief Financial Officer (CFO) is experiencing poor signal quality, and therefore the moderator may decide to defer certain budget discussions until the CFO's signal quality improves.

Signal reception quality can become degraded at a mobile endpoint due to the nature of a wireless communication link to the mobile endpoint. However, it is also possible that signal reception at a wired endpoint, e.g., one of the endpoints 11(2)-11(N), can become degraded due to network connectivity or other issues in the network 15 or related access networks. Consequently, the techniques described herein related to storing data tags for poor signal reception at an endpoint are also applicable to fixed or wired endpoint devices. The endpoint devices, e.g., 11(2)-11(N), are capable of reporting back to the conference server 12 about their poor signal quality, or a participant at that endpoint can send a command from a console at that endpoint to the conference server 12. The conference server 12 would then relay this even to the recording server 20 for generating the data tag, or the conference server 12 or some intermediary device would generate the data tag.

In sum, a method is provided in which, at a recording server that is in communication with a plurality of endpoints in a conference session, multimedia received from the plurality of endpoints participating in the conference session is recorded. The recording server obtains geographical location information for at least one mobile endpoint participating in the conference session as the at least one mobile endpoint moves. The recording server temporally correlates the geographical location information for the at least one endpoint with recorded multimedia data for the conference session. The recording server stores data tags for the geographical location information for the at least one mobile endpoint in association with the recorded multimedia data for subsequent use in indexing to map data in order to retrieve a portion of the recorded multimedia data of the conference session for playback.

Also provided, in another form, is one or more computer readable storage media encoded with software comprising computer executable instructions and when the software is executed operable to: at a recording server that is in communication with a plurality of endpoints in a conference session, record multimedia received from the plurality of endpoints participating in the conference session; obtain geographical location information for at least one mobile endpoint participating in the conference session as the at least one mobile endpoint moves; temporally correlate the geographical location information for the at least one endpoint with recorded multimedia data for the conference session; and store data tags for the geographical location information for the at least one mobile endpoint in association with the recorded multimedia data for subsequent use in indexing to map data in order to retrieve a portion of the recorded multimedia data of the conference session for playback.

Further still, an apparatus is provided comprising a network interface unit configured to receive multimedia from a plurality of endpoints participating in a conference session; and a processor configured to be coupled to the network interface unit. The processor is configured to: record multimedia received from the plurality of endpoints participating in the conference session; obtain geographical location information for at least one mobile endpoint participating in the conference session as the at least one mobile endpoint moves; temporally correlate the geographical location information for the at least one endpoint with recorded multimedia data for the conference session; and store data tags for the geographical location information for the at least one mobile endpoint in association with the recorded multimedia data for subsequent use in indexing to map data in order to retrieve a portion of the recorded multimedia data of the conference session for playback.

The above description is intended by way of example only.

What is claimed is:

1. A method comprising:
    at a user device, displaying a map indicating geographical locations of a conference participant during a previously conducted conference session, wherein the geographical locations are determined based on geographical locations of a mobile device used by the conference participant during the conference session;
    receiving a selection of a location in the map; and
    receiving a notification via an email message, with a link that, when selected, causes a recording server to retrieve and make available for playback recorded multimedia data for a segment of the conference session beginning at a point in time during the conference session when the mobile device was at the location of the selection in the map.

2. The method of claim 1, further comprising issuing, at the user device, a command to the recording server to playback the recorded multimedia data from a point in time when the mobile device experienced poor signal reception quality.

3. The method of claim 2, wherein the point in time when the mobile device experienced poor signal reception quality was previously indicated to the recording server by the mobile device.

4. The method of claim 1, further comprising issuing, at the user device, a command to playback the recorded multimedia data from a point in time when a particular participant joined or left the conference session.

5. The method of claim 4, wherein the point in time when the particular participant joined or left the conference session was previously detected and indicated to the recording server by an endpoint of the particular participant.

6. The method of claim 1, further comprising issuing, at a user device, a command to the recording server to playback the recorded multimedia data from a point in time when image analysis of video associated with the conference session detects physical movement of the conference participant.

7. The method of claim 6, wherein the point in time when physical movement of the conference participant occurred was previously detected and indicated to the recording server by an endpoint of the conference participant.

8. The method of claim 1, further comprising contacting an authentication server to authenticate the conference participant, performed before the retrieving of the recorded multimedia data.

9. An apparatus comprising:
a network interface unit that enables network communication; and
a processor in communication with the network interface unit, wherein the processor:
displays a map indicating geographical locations along a route of a conference participant during a previously conducted conference session, wherein the geographical locations are determined based on geographical locations of a mobile device used by the conference participant during the conference session;
receives a selection from the conference participant of a location in the displayed map; and
receives a notification via an email message, with a link that, when selected, causes a recording server to retrieve and make available for playback recorded multimedia data for a segment of the conference session beginning at a point in time during the conference session when the mobile device was at the location of the selection in the map.

10. The apparatus of claim 9, wherein the processor issues a command to the recording server to playback the recorded multimedia data from a point in time when the mobile device experienced poor signal reception quality.

11. The apparatus of claim 10, wherein the point in time when the mobile device experienced poor signal reception quality was previously indicated to the recording server by the mobile device.

12. The apparatus of claim 9, wherein the processor issues a command to playback the recorded multimedia data from a point in time when a particular participant joined or left the conference session.

13. The apparatus of claim 12, wherein the point in time when the particular participant joined or left the conference session was previously detected and indicated to the recording server by an endpoint of the particular participant.

14. The apparatus of claim 9, wherein the processor issues a command to the recording server to playback the recorded multimedia data from a point in time when image analysis of video associated with the conference session detects physical movement of the conference participant.

15. The apparatus of claim 14, wherein the point in time when physical movement of the conference participant occurred was previously detected and indicated to the recording server by an endpoint of the conference participant.

16. The apparatus of claim 9, wherein the processor communicates with an authentication server to authenticate the conference participant, the communication performed before the retrieving of the recorded multimedia data.

\* \* \* \* \*